United States Patent
Zhao et al.

(10) Patent No.: US 11,628,818 B2
(45) Date of Patent: Apr. 18, 2023

(54) METHODS AND SYSTEM FOR STOPPING AN ENGINE OF A HYBRID VEHICLE

(71) Applicant: Ford Global Technologies, LLC, Dearborn, MI (US)

(72) Inventors: Yanan Zhao, Ann Arbor, MI (US); Christopher John Teslak, Plymouth, MI (US); Stuart N. Ford, Seattle, WA (US); Ralph Wayne Cunningham, Milan, MI (US); Judhajit Roy, Royal Oak, MI (US); Chenliu Stephen Lu, Ann Arbor, MI (US); Girish Gokul Chennupalli, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 16/922,840

(22) Filed: Jul. 7, 2020

(65) Prior Publication Data

US 2022/0009473 A1  Jan. 13, 2022

(51) Int. Cl.
*B60W 20/00* (2016.01)
*F02N 11/04* (2006.01)
*F02N 11/08* (2006.01)
*B60W 10/06* (2006.01)
*B60W 10/30* (2006.01)
(Continued)

(52) U.S. Cl.
CPC .......... *B60W 20/00* (2013.01); *B60W 10/026* (2013.01); *B60W 10/06* (2013.01); *B60W 10/10* (2013.01); *B60W 10/30* (2013.01); *F02D 41/042* (2013.01); *F02D 41/062* (2013.01); *F02D 41/123* (2013.01); *F02N 11/04* (2013.01); *F02N 11/0862* (2013.01); *F16H 61/143* (2013.01); *B60K 6/26* (2013.01); *B60K 6/387* (2013.01); *B60W 2510/1045* (2013.01); *B60W 2510/244* (2013.01); *B60W 2540/10* (2013.01); *B60W 2540/12* (2013.01); *B60Y 2200/92* (2013.01)

(58) Field of Classification Search
CPC .... B60W 10/026; B60W 10/06; B60W 10/10; B60W 10/30; B60W 20/00; B60W 2510/1045; B60W 2510/244; B60W 2510/104; B60W 2540/10; B60W 2540/12; B60W 2030/1809; B60W 2710/024; B60W 10/08; B60W 20/40; F02D 41/042; F02D 41/062; F02D 41/123; F02N 11/04; F02N 11/0862; F16H 61/143; B60Y 2200/92; B60K 2006/268; B60K 6/485
See application file for complete search history.

(56) References Cited

U.S. PATENT DOCUMENTS 5,928,111 A * 7/1999 Sakakibara ........... F02D 41/022
477/181
6,275,759 B1 * 8/2001 Nakajima .............. B60K 6/543
290/34

(Continued)

*Primary Examiner* — Logan M Kraft
*Assistant Examiner* — Sherman D Manley
(74) *Attorney, Agent, or Firm* — David Kelley; McCoy Russell LLP

(57) ABSTRACT

A method and system for operating a vehicle that includes an automatic transmission with a torque converter clutch is described. In one example, the method includes predicting a time that the torque converter clutch will open so that stopping rotation of the engine may be requested before the torque converter clutch is opened. The stopping rotation of the engine is requested to conserve fuel.

19 Claims, 4 Drawing Sheets

(51) Int. Cl.
  *F02D 41/12* (2006.01)
  *B60W 10/10* (2012.01)
  *F02D 41/04* (2006.01)
  *F02D 41/06* (2006.01)
  *F16H 61/14* (2006.01)
  *B60W 10/02* (2006.01)
  *B60K 6/387* (2007.10)
  *B60K 6/26* (2007.10)

(56) References Cited

U.S. PATENT DOCUMENTS

| | | | |
|---|---|---|---|
| 9,039,568 B2 | 5/2015 | Banker et al. | |
| 9,840,977 B1 | 12/2017 | Yurgil et al. | |
| 10,393,259 B2* | 8/2019 | Meyer | F16H 61/143 |
| 2002/0019691 A1* | 2/2002 | Matsubara | B60L 50/16 |
| | | | 903/945 |
| 2002/0046732 A1* | 4/2002 | Katou | B60W 10/06 |
| | | | 123/339.24 |
| 2003/0197385 A1* | 10/2003 | Onoyama | F16H 61/66272 |
| | | | 290/40 R |
| 2004/0092362 A1* | 5/2004 | Ayabe | F16H 61/143 |
| | | | 477/62 |
| 2011/0147154 A1* | 6/2011 | Demir | F16H 61/0031 |
| | | | 192/3.3 |
| 2014/0365092 A1* | 12/2014 | Kawamoto | F02D 41/023 |
| | | | 701/54 |
| 2014/0373809 A1* | 12/2014 | Kawamoto | F02D 41/12 |
| | | | 123/332 |
| 2015/0087475 A1* | 3/2015 | Dai | B60K 6/38 |
| | | | 477/4 |
| 2015/0258973 A1* | 9/2015 | Hawkins | B60W 30/18072 |
| | | | 180/65.265 |
| 2016/0297418 A1* | 10/2016 | Zhang | B60W 20/19 |
| 2016/0297419 A1* | 10/2016 | Zhang | B60W 10/026 |
| 2018/0134276 A1* | 5/2018 | Zhao | B60L 7/26 |
| 2019/0032773 A1* | 1/2019 | Oota | F16H 59/74 |
| 2019/0351908 A1* | 11/2019 | Marsden | B60W 30/18072 |

* cited by examiner

METHODS AND SYSTEM FOR STOPPING AN ENGINE OF A HYBRID VEHICLE

FIELD

The present description relates to methods and a system for stopping an engine of a vehicle. The methods and systems may extend cut-off of fuel to an engine during an engine stopping procedure to conserve fuel.

BACKGROUND AND SUMMARY

A vehicle may include an internal combustion engine that enters a fuel cut-off mode while the vehicle is traveling on a road while driver demand torque is low. The fuel cut-off mode may reduce fuel consumption and engine emissions. Therefore, it may be desirable to remain in fuel cut-off mode as long as possible. However, remaining in fuel cut-off mode may be challenging for vehicles that include an automatic transmission because the automatic transmission may not transfer sufficient torque to rotate the engine when the torque converter is unlocked. Consequently, the engine may be re-fueled before vehicle speed becomes low when the torque converter must be opened to improve vehicle drivability, then the engine may be stopped to conserve fuel after vehicle speed reaches zero. However, refueling the engine may increase fuel consumption and emissions.

The inventors herein have recognized the above-mentioned issues and have developed a method for operating a vehicle driveline, comprising: unlocking a torque converter clutch in response to a first unlock schedule during a first condition; and unlocking the torque converter clutch in response to a second unlock schedule during a second condition, the second condition including a brake being applied, an integrated starter/generator having torque capacity to start an engine, and a battery having capacity to start the engine.

By extending locking of a torque converter, it may be possible for fuel supplied to an engine to be cut-off longer so that the engine need not be re-fueled before vehicle speed reaches zero. In particular, an engine may remain in fuel cut-off mode at lower vehicle speeds by maintaining a locked torque converter clutch. In addition, an engine stop rotation request may be issued or commanded in response to a torque converter clutch unlock prediction being true so that the engine need not be re-fueled before vehicle speed reaches zero. Consequently, fuel may be conserved and engine emissions may be reduced.

The present description may provide several advantages. Specifically, the approach may reduce fuel consumption by a vehicle. Further, the approach may extend an amount of time that a torque converter clutch may be locked to further reduce engine fuel consumption and extend operation of regenerative braking. In addition, the approach may prevent automatic engine stopping during conditions where it may be more difficult to automatically restart an engine. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
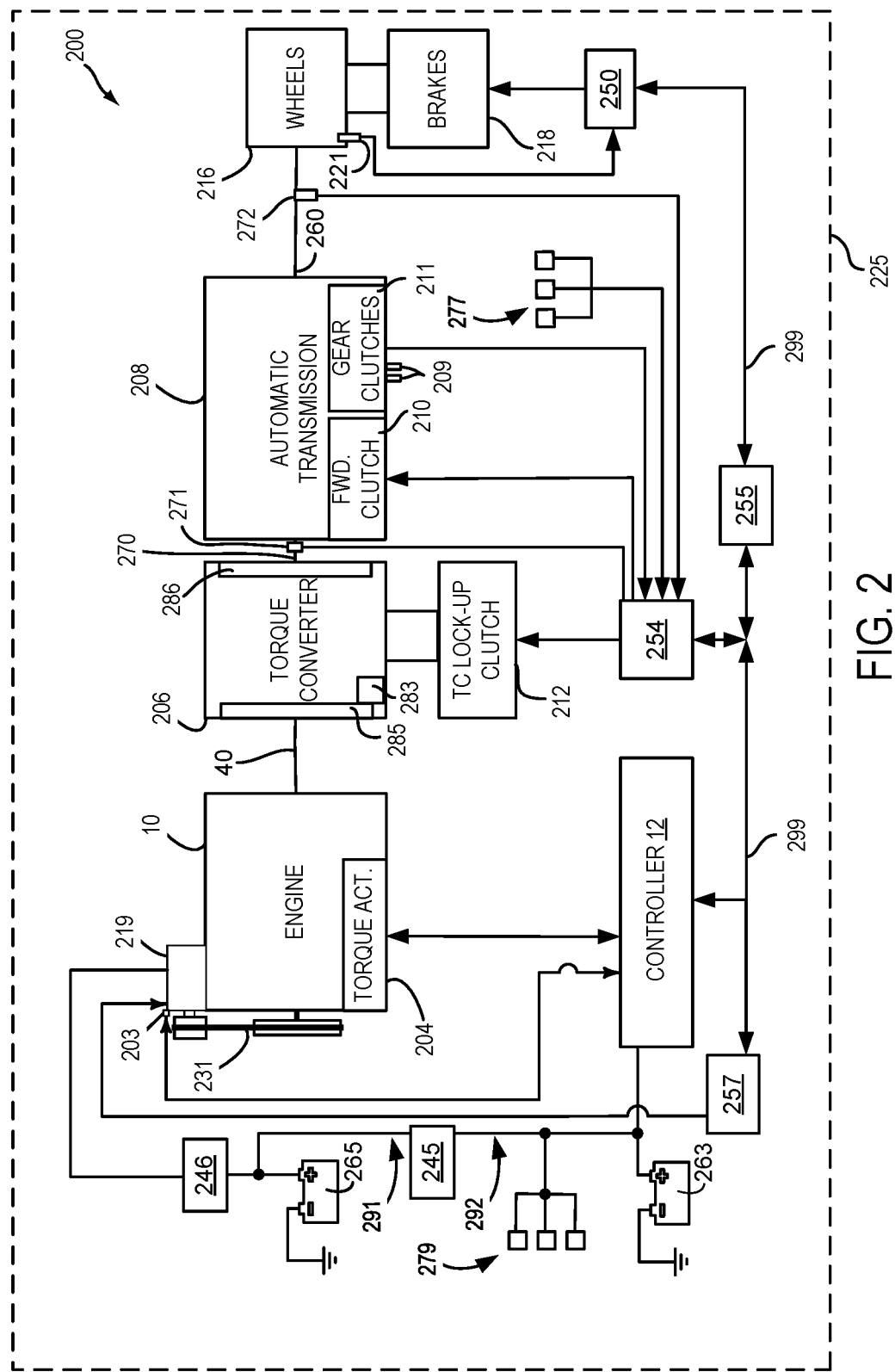
FIG. 2 shows a schematic diagram of an example vehicle driveline or powertrain including the internal combustion engine shown in FIG. 1.
Figure 3:
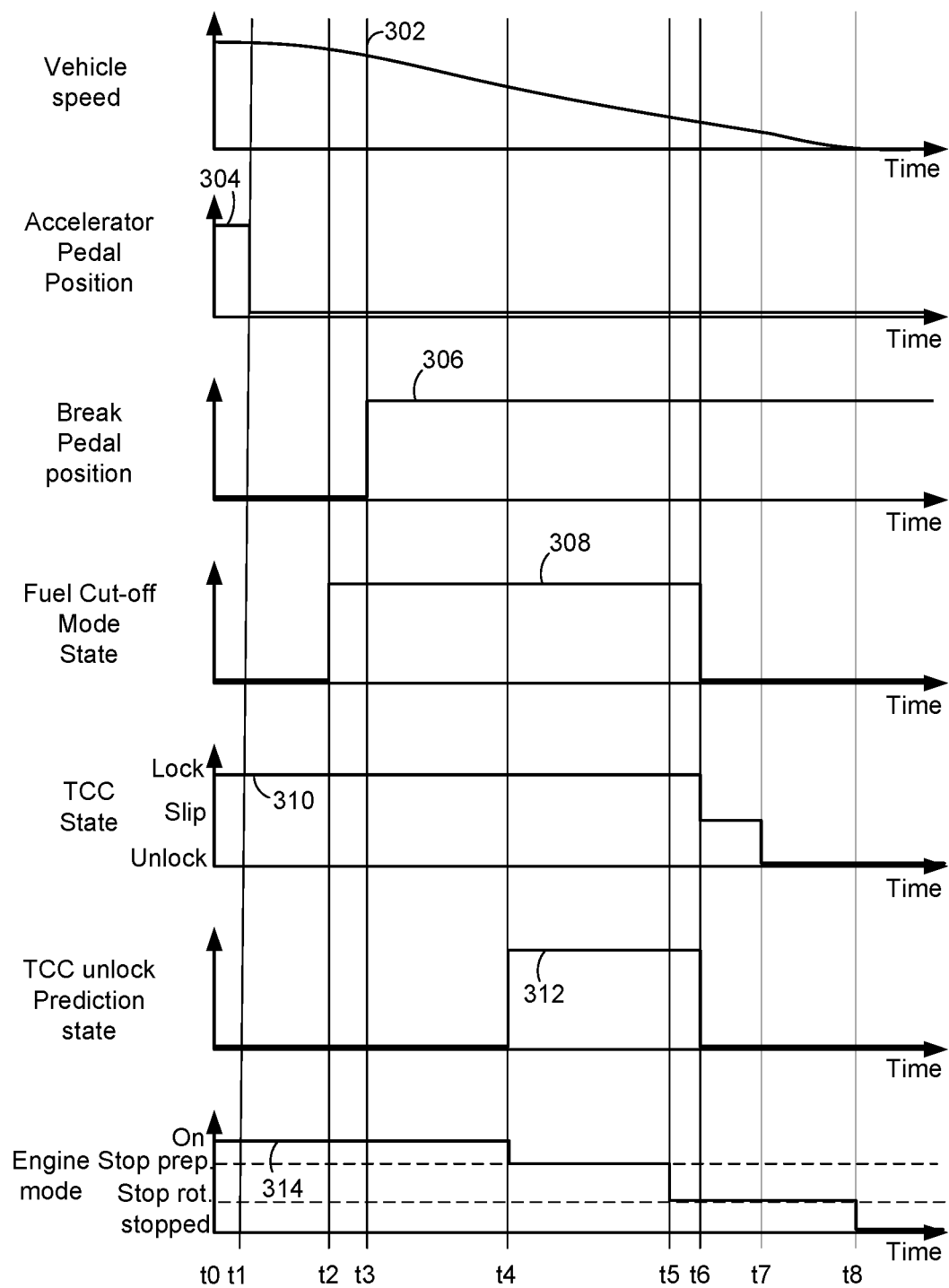
FIG. 3 shows an example vehicle operating sequence according to the method of FIG. 4.

The present description is related to stopping an internal combustion engine. The engine may initially stop combusting fuel during conditions of low driver demand torque. The engine may continue to not combust fuel by requesting stopping engine rotation before a torque converter clutch is opened in response to a low vehicle speed. As a result, the engine may not be restarted before the vehicle is fully stopped, thereby reducing an amount of fuel that may be consumed by the engine. The engine may be restarted after the vehicle is stopped or in response to an increase in driver demand torque. The engine may be of the type shown in FIG. 1. Alternatively, the engine may be a diesel engine. The engine may be included in a powertrain or driveline as shown in FIG. 2. An example engine stopping procedure is shown in FIG. 3. The engine may be stopped according to the method shown in FIG. 4.

Figure 1:
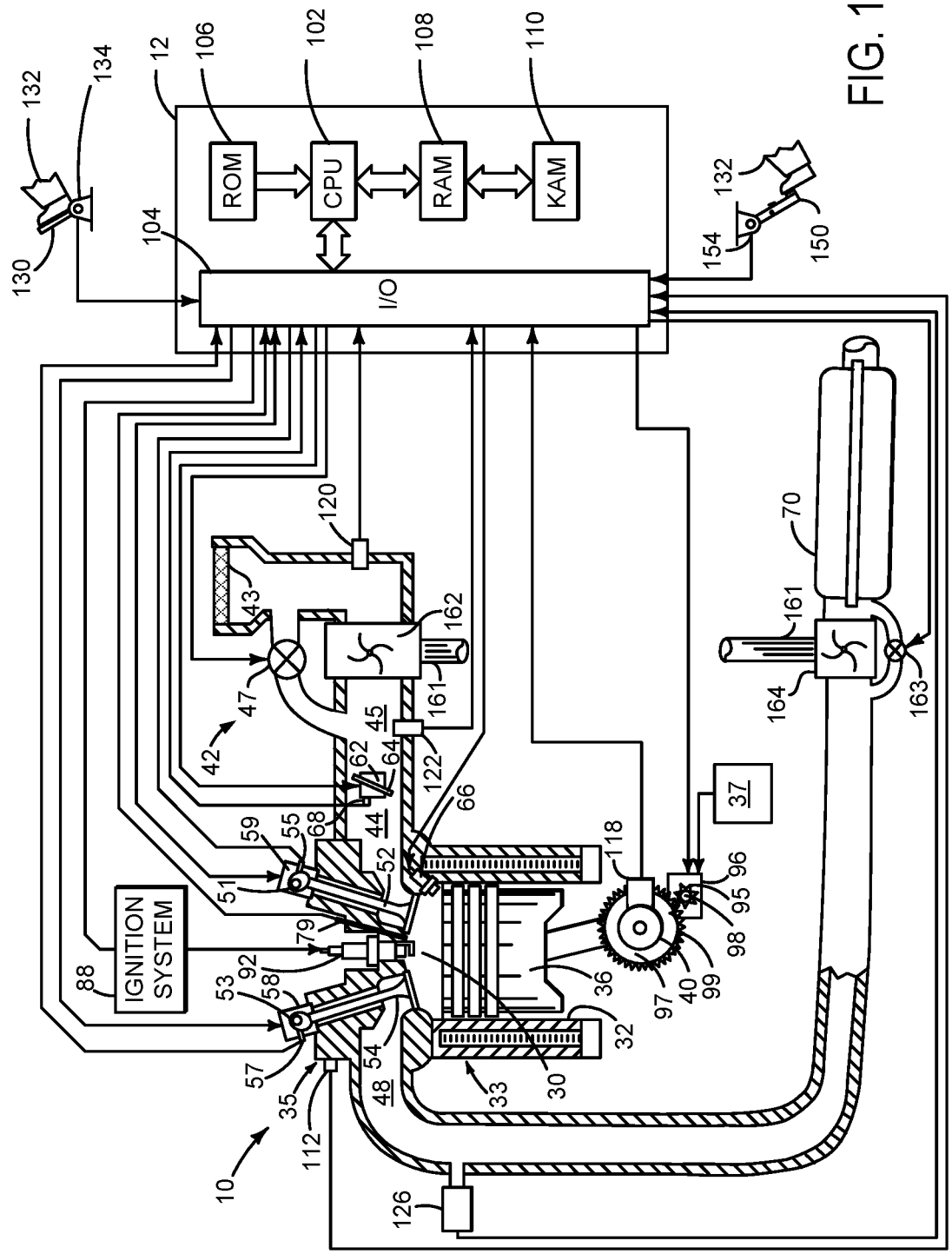
FIG. 1 shows a schematic diagram of an internal combustion engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 20 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Starter 96 may receive electrical power from and provide electrical power to battery 37. In one example, battery 37 may be a 12 volt battery.

Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A lift amount and/or a phase or position of intake valve 52 may be adjusted relative to a position of crankshaft 40 via valve adjustment device 59. A lift amount and/or a phase or position of exhaust valve 54 may be adjusted relative to a position of crankshaft 40 via valve adjustment device 58. Valve adjustment devices 58 and 59 may be electro-mechanical devices, hydraulic devices, or mechanical devices.

Controller 12 may reduce compression in cylinder 30 via opening compression relief valve 79 during engine starting to reduce engine cranking torque.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. A temperature of oil in crankcase 39 may be sensed via temperature sensor 38.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: cylinder head temperature from temperature sensor 112 coupled to cylinder head 35; a position sensor 134 coupled to an propulsion pedal 130 for sensing force applied by human foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, integrated starter/generator (ISG) controller 257, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, ISG controller 257, transmission controller 254, and brake controller 250 to achieve driver input requests and other requests that are based on vehicle operating conditions.

In other examples, the partitioning of controlling powertrain devices may be partitioned differently than is shown in FIG. 2. For example, a single controller may take the place of vehicle system controller 255, engine controller 12, ISG controller 257, transmission controller 254, and brake controller 250. Alternatively, the vehicle system controller 255 and the engine controller 12 may be a single unit while the ISG controller 257, transmission controller 254, and the brake controller 250 are standalone controllers.

Driveline 200 is shown to include a belt integrated starter/generator (ISG) 219. ISG 219 may be coupled to crankshaft 40 of engine 10 via a belt 231. Alternatively, ISG 219 may be directly coupled to crankshaft 40. ISG 219 may provide a negative torque to driveline 200 when charging electric energy storage device 263. ISG 219 may also provide a positive torque to rotate driveline 200 via energy supplied by electric energy storage device (e.g., a battery or capacitor) 265. In one example, electric energy storage device 265 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and electric energy storage device 265. Low voltage bus 292 is electrically coupled to electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 265. Vehicle system controller 255 may request increased engine torque to overcome the charging torque and to meet the driver demand torque.

Torque output of engine 10 may be adjusted via torque actuator 204, such as a fuel injector, throttle, etc. An engine output torque may be transmitted to torque converter impeller 285 via crankshaft 40. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque that is directly transferred to the transmission to be adjusted. The transmission controller 254 may be configured to adjust the amount of torque transmitted by torque converter 212 by adjusting the torque converter lock-up clutch 212 in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller 254 also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to the driver pressing his/her foot on a brake pedal (not shown) and/or in response to instructions within brake controller 250. Further, brake controller 250 may apply brakes 218 in response to information and/or requests made by vehicle system controller 255. In a similar way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to increase speed of vehicle 225, vehicle system controller may obtain a driver demand torque or power request from an propulsion pedal or other device. Vehicle system controller 255 then allocates a fraction of the requested driver demand torque to the engine 10 and the remaining fraction to the BISG 219. Vehicle system controller 255 requests the engine torque from engine controller 12. If the BISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge battery 279, a charging torque (e.g., a negative BISG torque) may be requested while a non-zero driver demand torque is present. Vehicle system controller 255 may request increased engine torque to overcome the charging torque to meet the driver demand torque.

In response to a request to reduce speed of vehicle 225 and provide regenerative braking, vehicle system controller may provide a negative desired wheel torque based on vehicle speed and brake pedal position. Vehicle system controller 255 then allocates a fraction of the negative desired wheel torque to the BISG 219 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. BISG 219 supplies a negative torque to transmission input shaft 270, but negative torque provided by BISG 219 may be limited by transmission controller 254 which outputs a transmission input shaft negative torque limit (e.g., not to be exceeded threshold value). Further, negative torque of BISG 219 may be limited (e.g., constrained to less than a threshold negative threshold torque) based on operating conditions of battery 279. Any portion of desired negative wheel torque that may not be provided by BISG 219 because of transmission or BISG limits may be allocated to friction brakes 218 so that the desired wheel torque is provided by a combination of negative wheel torque from friction brakes 218 and BISG 219.

Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative BISG torque does not cause the wheel torque limit to be exceeded. For example, if controller 250 issues a negative wheel torque limit of 10 N-m, BISG torque is adjusted to provide less than 10 N-m (e.g., 9 N-m) of negative torque at the wheels, including accounting for transmission gearing.

The system of FIGS. 1 and 2 provides for a vehicle system, comprising: an internal combustion engine; an automatic transmission including a torque converter and a torque converter clutch; and a controller including executable instructions stored in non-transitory memory that cause the controller to predict a transmission output shaft speed at which the torque converter clutch will be commanded to unlock after a time duration. The vehicle system includes where the time duration is a predicted future time from when a torque converter clutch is predicted to open or unlock to an actual unlock command of the torque converter clutch, and where the predicted transmission output shaft speed is based on a time to prepare vehicle subsystems for stopping of the internal combustion engine. The vehicle system includes where the time to prepare the vehicle subsystems for stopping the internal combustion engine is based on vehicle subsystem components, and where the predicted transmission output shaft speed is based on a rate of change of speed of a transmission output shaft. The vehicle system includes where the preparation for internal combustion engine shut down begins when a predicted torque converter unlocking event is true, and where the predicted torque converter unlocking event is true based on a predicted output shaft speed. The vehicle system further comprises additional instructions to request stopping of rotation of the internal combustion engine. The vehicle system further comprises additional instructions to extend locking of the torque converter clutch responsive to vehicle speed. The vehicle system further comprises additional instructions to activate an electric pump of the automatic transmission in response to preparing for stopping of the internal combustion engine.

Referring now to FIG. 3, plots of an example vehicle operating sequence is shown. The vehicle operating sequence that is shown in FIG. 3 may be provided via the system of FIGS. 1 and 2 in cooperation with the method of FIG. 4. The vertical lines at times t0-t8 represent times of interest during the engine operating sequence. The plots shown in FIG. 3 are aligned in time.

The first plot from the top of FIG. 3 is a plot of vehicle speed versus time. The vertical axis represents vehicle speed and vehicle increases in the direction of the vertical axis arrow. The horizontal axis represents time and time increases from the left side of the plot to the right side of the plot. Trace 302 represents vehicle speed.

The second plot from the top of FIG. 3 is a plot of propulsion pedal position state versus time. The vertical axis represents propulsion pedal position state and the propulsion pedal is applied when trace 304 is at a higher level near the vertical axis arrow. The propulsion pedal is not applied when trace 304 is near the level of the horizontal axis. Trace 304 represents propulsion pedal position state. The horizontal axis represents time and time increases from the left side of the plot to the right side of the plot.

The third plot from the top of FIG. 3 is a plot of brake pedal position state versus time. The vertical axis represents brake pedal position state and the brake pedal is applied when trace 306 is at a higher level near the vertical axis arrow. The brake pedal is not applied when trace 306 is near the level of the horizontal axis. Trace 306 represents brake pedal position state. The horizontal axis represents time and time increases from the left side of the plot to the right side of the plot.

The fourth plot from the top of FIG. 3 is a plot of fuel cut-off mode state versus time. The vertical axis represents the fuel cut-off mode state and the fuel cut-off mode is activated when trace 308 is at a higher level near the vertical axis arrow. The fuel cut-off mode is not activated when trace 308 is at a lower level near the horizontal axis. The horizontal axis represents time and time increases from the left side of the plot to the right side of the plot. Trace 308 represents the fuel cut-off state.

The fifth plot from the top of FIG. 3 is a plot of torque converter clutch (TCC) state versus time. The vertical axis represents the TCC state and the TCC is locked (e.g., preventing less than a threshold speed difference between the torque converter impeller speed and the torque converter turbine speed) when trace 310 is at a higher level near the vertical axis arrow. The TCC state is unlocked when trace 310 is at a lower level near the horizontal axis. The horizontal axis represents time and time increases from the left side of the plot to the right side of the plot. Trace 310 represents the TCC state.

The sixth plot from the top of FIG. 3 is a plot of torque converter clutch (TCC) unlock prediction state versus time. The vertical axis represents the TCC unlock prediction state and the TCC unlock prediction is active (e.g., TCC unlock event is predicted) when trace 312 is at a higher level near the vertical axis arrow. The TCC unlock prediction state is not active (e.g., the TCC unlock event is not predicted) when trace 312 is at a lower level near the horizontal axis. The horizontal axis represents time and time increases from the left side of the plot to the right side of the plot. Trace 312 represents the TCC unlock prediction state.

The seventh plot from the top of FIG. 3 is a plot of engine operating mode versus time. The vertical axis represents the engine operating mode and the engine operating modes are indicated along the vertical axis. The engine operating modes include "On" or running (e.g., rotating the engine, which may or may not include combusting fuel), "Engine stop prep." (e.g., engine stop preparation, "Stop rot." (e.g., stopping engine rotation or pull-down), and "Stopped" (e.g., where the engine is not rotating). The horizontal axis represents time and time increases from the left side of the plot to the right side of the plot. Trace 314 represents engine operating mode.

At time t0, the vehicle is cruising at a higher speed and the propulsion pedal is applied. The brake pedal is not applied and the engine is not in fuel cut-off mode. The TCC is locked and the TCC unlock event is not predicted. The engine is operating in a running mode (e.g., rotating).

At time t1, the driver (not shown) fully releases the propulsion pedal and the vehicle speed begins to decrease. The brake pedal is not applied and the engine is not in fuel cut-off mode. The TCC is locked and the TCC unlock event is not predicted. The engine is in the running mode.

At time t2, the propulsion pedal is not applied and the engine enters fuel cut-off mode (e.g., fuel injection to the engine ceases). The brake pedal is not applied and the vehicle speed continues to decrease. The TCC remains locked and the TCC unlock prediction is not true. The engine continues in the running mode.

At time t3, the driver (not shown) applies the brake pedal while the propulsion pedal remains fully released. The fuel cut-off mode remains activated and the TCC is locked. The TCC unlock prediction is not true and the engine remains in a running mode.

At time t4, the propulsion pedal is not applied and the brake pedal is applied. The vehicle speed continues to decrease and the fuel cut-off mode remains activated so that the engine does not receive fuel. The TCC remains locked and the TCC unlock prediction is now true. The TCC unlock prediction state may be determined as described in further detail with regard to FIG. 4. The engine changes from running mode to prepare for stop mode in response to the TCC unlock prediction state being asserted. Thus, when the TCC unlock prediction is true, the engine changes into prepare for stop mode.

At time t5, the propulsion pedal is not applied and the brake pedal is applied. The vehicle speed continues to decrease and the fuel cut-off mode remains activated so that the engine does not receive fuel. The TCC remains locked and the TCC unlock prediction remains true. The engine mode changes from prepare for stop mode to stop or stopping rotation mode in response to an amount of time (e.g., T_pred2PD) passing since the most recent time that the TCC unlock prediction state is asserted. The amount of time between time t4 and time t5 is equal to T_pred2PD.

At time t6, the amount of time since the most recent TCC unlock prediction was asserted is equal to the predicted amount of time for the TCC to unlock (e.g., T_pred2UnLock). Thus, the amount of time between time t4 and time t6 is equal to the predicted amount of time it is expected or predicted to take for the TCC to be commanded to unlock from the initial prediction time t4. The TCC is commanded to unlock at this time and fuel cut-off mode is no longer activated in response to the unlocking of the TCC. The engine remains in stopping rotation mode and the TCC prediction state remains asserted. The brake pedal is applied and the propulsion pedal is not applied while vehicle speed continues to decrease.

At time t7, the TCC is fully unlocked while the vehicle speed continues to decrease. The propulsion pedal is not applied and the brake pedal is applied. The fuel cut-off mode is not active and the TCC prediction state changes to not asserted since the TCC is fully opened. The engine is still rotating (not shown) so the engine mode remains in a stopping rotation state. Fully unlocking the TCC allows the engine to stop before the vehicle or vice-versa.

At time t8, the engine speed reaches zero so the engine state is set to stopped. The vehicle speed is near zero and the propulsion pedal is not applied. The brake pedal is applied and fuel cut-off mode is not activated. The TCC is unlocked and the TCC prediction state remains not asserted since the TCC is fully open.

In this way, prediction of an opening event of the TCC may be the basis for determining when to changing the engine mode from preparing stop to stopping engine rotation mode. In addition, the fuel cut-out mode may be deactivated after the engine enters to the stopping engine rotation mode so that the engine may not receive fuel before the engine reaches zero speed. Accordingly, the engine may not be started when engine starting is not used to meet driver demand torque.

Figure 4:
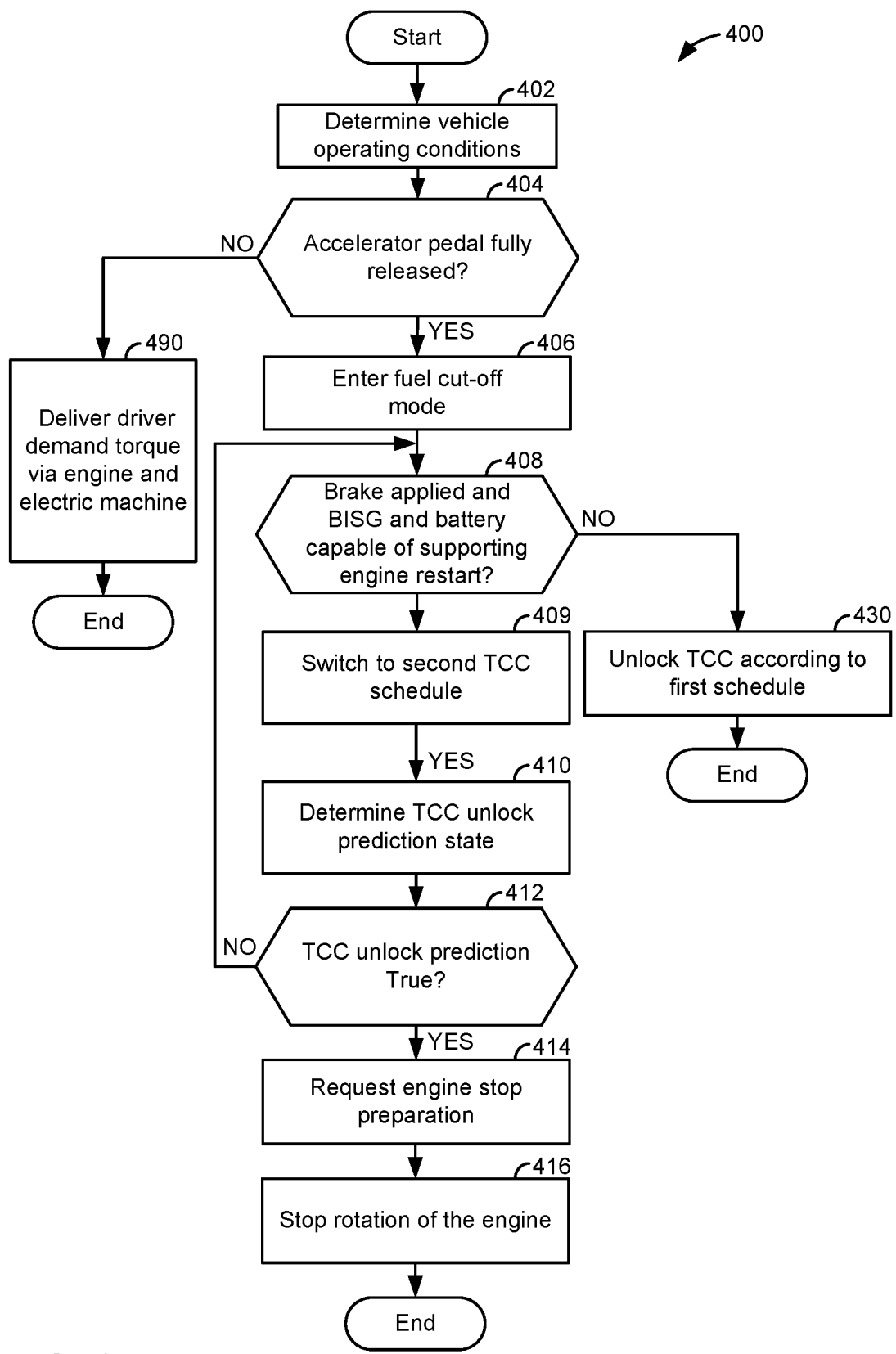
FIG. 4 shows a flowchart of an example method for stopping rotation of an engine and restarting an engine based on vehicle operating conditions.

Referring now to FIG. 4, a method for operating a driveline of a vehicle is shown. At least portions of method 400 may be implemented as executable controller instructions stored in non-transitory memory of a controller. Method 400 may operate in cooperation with the system of FIGS. 1 and 2. Additionally, portions of method 400 may be actions taken via a controller in the physical world to transform an operating state of an actuator or device.

At 402, method 400 determines vehicle operating conditions. Vehicle operating conditions may be determined or estimated via the various sensors described herein. Vehicle operating conditions may include, but are not limited to vehicle speed, engine speed, catalyst temperature, driver demand torque, propulsion pedal position, engine temperature, and ambient temperature and pressure. Method 400 proceeds to 404.

At 404, method 400 judges if the propulsion pedal is fully released. Method 400 may judge if the propulsion pedal is fully released according to output an propulsion pedal position sensor. If method 400 judges that the propulsion pedal is fully released, the answer is yes and method 400 proceeds to 406. Otherwise, the answer is no and method 400 proceeds to 490. In alternative examples, method 400 may simply judge if driver demand torque is less than a threshold torque. The driver demand torque may be a function of propulsion pedal position and vehicle speed. If method 400 judges that driver demand torque is less than the threshold torque, the answer is yes and method 400 proceeds to 406. Otherwise, the answer is no and method 400 proceeds to 490.

At 490, method 400 operates the driveline to generate the requested driver demand torque. The driver demand torque may be generated via the engine and an electric machine (e.g., ISG and/or BISG) in some examples. Method 400 proceeds to exit.

At 406, method 400 commands activation of a fuel cut-off mode. In fuel cut-off mode, fuel delivery to the engine is ceased while the engine continues to rotate. The engine's intake and exhaust poppet valves may continue to open and close during intake and exhaust strokes of cylinders, or the intake and exhaust poppet valves may be commanded fully closed over an entire engine cycle (e.g., four strokes) while the engine continues to rotate. Method 400 proceeds to 408.

At 408, method 400 judges if the brake pedal is applied and BISG and vehicle battery (e.g., 279 of FIG. 2) or electric energy storage device have capacity to start the engine if the engine were to be stopped. Method 400 judges if the brake pedal is applied and if the BISG and vehicle battery have capacity to start the engine to determine if the torque converter clutch unlocking schedule may be extended. Extending the torque converter clutch unlock schedule may allow the torque converter clutch to remain locked at lower vehicle speeds as compared to if the torque converter clutch locking schedule is not extended. If method 400 judges that the brake is applied and the BISG and vehicle battery have capacity to start the engine if the engine is stopped, the answer is yes and method 400 proceeds to 410. Otherwise, the answer is no and method 400 proceeds to 430.

Method 400 may judge that the brake pedal is applied in response to output of a brake pedal position sensor.

The BISG may have capacity to start the engine if it may generate sufficient torque to rotate the engine. For example, if it takes 30 Newton-meters (Nm) to rotate the engine, the BISG is outputting 20 Nm and the BISG has a total torque output capacity of 60 Nm, then it may be judged that the BISG has torque capacity to start the engine. On the other hand, if the BISG has capacity to generate only 25 Nm, then it may be judged that the BISG does not have capacity to start the engine. Similarly, the vehicle's battery (e.g., 279 of FIG. 2) may have a discharge capacity of 6 kilowatts (KW), and if the BISG or starter consumes 5 KW to start the engine, then it may be judged that the battery has discharge capacity to start the engine. Conversely, if the vehicle's battery has a discharge capacity of 4 KW, then it may be judged that the battery does not have discharge capacity to start the engine.

In one example, method 400 may judge if the battery's discharge power limit is greater than a first threshold (e.g., Cal1) to determine if the battery's discharge power is sufficient to start the engine. Method 400 may also judge if the BISG's torque capacity is greater than a second threshold (e.g., Cal2) to determine if the BISG's torque capacity is sufficient to start the engine. Method 400 may also judge if the battery's state of charge (SOC) is greater than a third threshold (e.g., Cal3) to determine if the battery's SOC is sufficient to start the engine. If these conditions are met, the answer is yes and method 400 proceeds to 409. Otherwise, the answer is no and method 400 proceeds to 430.

At 430, method 400 unlocks the TCC according to a first TCC unlock schedule. The first TCC unlock schedule may cause the controller to command the TCC fully open as a function of transmission output shaft speed and driver demand torque. The first TCC unlock schedule may output values that cause the TCC to open at higher transmission output shaft speeds as compared to a second TCC unlock schedule. For example, if driver demand torque is zero, the first TCC unlock schedule may cause the TCC to unlock at a transmission output shaft speed of 314 radians/minute and the second TCC unlock schedule may cause the TCC to unlock at a transmission output shaft speed of 100 radians/minute. Method 400 proceeds to exit.

At 409, method 400 switches to unlocking the TCC according to a second TCC. In one example, the second TCC unlock schedule may output values that cause the TCC to open at lower transmission output shaft speeds as compared to the first TCC unlock schedule. Method 400 proceeds to 410.

At 410, method 400 determines a TCC unlock prediction state. In one example, the TCC unlock prediction state may be determined via the following equations:

$$\text{State}_{TCUnlockPred} = (OSS \leq OSS\_TCUnlockPred) \,\&\&\, (\text{State}_{TCC} == \text{Locked})$$

$$OSS\_TCUnlockPred = OSS\_TCUnLockSch - T\_pred2UnLock \cdot d(OSS)/dt$$

where $\text{State}_{TCUnlockPred}$ is the torque converter unlock prediction state, OSS is the transmission output shaft speed, $\text{State}_{TCC}$ is the current torque converter state. && is a logical AND operator, == is a logical equal operator, OSS_TCUnlockPred is the predicted transmission output shaft speed that the TCC will be commanded to unlock after T_pred2UnLock time duration that is based on a second TCC unlock schedule, OSS_TCUnLockSch is the transmission output shaft speed at which the TCC is scheduled to open as determined from the second unlock schedule, T_pred2UnLock is the predicted amount of time into the future from when the TCC is predicted to open or unlock to the actual unlock command of the TCC (e.g., the time between time t4 and time t6 in FIG. 3), and d(OSS)/dt is the derivative or rate of change of the transmission output shaft speed.

Method 400 may also prepare the driveline for the engine stopping (e.g., not rotating). In one example, method 400 may activate an electric transmission pump to prepare the driveline for engine stopping. The electric transmission pump may be activated so that the transmission may remain in a particular gear or perform a particular gear shift via maintaining activation of one or more transmission clutches. Method 400 may also indicate that the driveline is being prepared for an engine stop via adjusting the engine mode state to preparing the driveline for engine stop. Method 400 proceeds to 412.

At 412, method 400 judges if the TCC unlock prediction is true. If method 400 judges that the TCC unlock prediction is true, then the answer is yes and method 400 proceeds to 414. Otherwise, the answer is no and method 400 returns to 408.

At 414, method 400 requests an engine stop preparation. In one example, method 400 may require that the engine stop preparation time (T_pred2PD) meets the requirement of T_pred2UnLock≥T_pred2PD+T_diff, where T_diff is a small positive calibratable number (e.g., 0.2 seconds). T_diff is shown in FIG. 3 as the amount of time between time t5 and time t6. T_pred2PD is shown in FIG. 3 as the amount of time between time t4 and time t5. This is a calibratable time to have related vehicle subsystems (e.g., engine, transmission and others) to get prepared and be ready for the upcoming engine stop. For example, if the transmission electric pump needs to run momentarily to check for internal faults prior to initiating the engine shutdown, it may be activated. In another example, if it is desired for the transmission to shift into a different state prior to the shutdown, the transmission may be shifted. In still another example, it may be desired that the purge system is to be turned off. The time T_pred2PD shall be the maximum of all the time durations required from different subsystems to prepare for engine stop.

At 416, method 400 requests an engine pull-down or stopping rotation of the engine. Method requests the engine pull-down or stopping rotation of the engine at time T_pred2PD after TCC unlock prediction is true. Once the engine pull-down or stopping engine rotation is requested, fuel may not be supplied to the engine unless the brake pedal is released or driver demand torque increases before the engine is stopped. The pull-down or stopping engine rotation request may also stop spark from being delivered to engine cylinders. In addition, camshafts may be set to a base timing while the engine pull-down or stopping engine rotation is requested. The engine pull-down or stopping engine rotation request may be generated T_diff seconds before the TCC is commanded to an unlocked state. Method 400 proceeds to exit.

Thus, the method of FIG. 4 provides for a method for operating a vehicle driveline, comprising: unlocking a torque converter clutch in response to a first unlock schedule during a first condition; and unlocking the torque converter clutch in response to a second unlock schedule during a second condition, the second condition including a brake being applied, an integrated starter/generator having torque capacity to start an engine, and a battery having capacity to start the engine. The method includes where the first unlock schedule unlocks the torque converter clutch at a higher vehicle speed than the second unlock schedule unlocks the torque converter clutch. The method includes where the battery capacity includes a discharge capacity being greater than a threshold. The method includes where the battery capacity includes a battery state of charge being greater than a threshold. The method includes where the first condition includes the brake not being applied. The method includes where the first condition includes an propulsion pedal being applied. The method includes where the battery supplies power to an integrated starter generator.

The method of FIG. 4 also provides for a method for operating a vehicle driveline, comprising: while an propulsion pedal is fully released, unlocking a torque converter clutch in response to a second unlock schedule, the unlocking performed in response to a brake being applied, an integrated starter/generator having torque capacity to start an engine, and a battery having capacity to start the engine. The method further comprises entering an engine into a fuel cut-off mode. The method further comprises preparing a transmission for stopping rotation of the engine. The method includes where preparing the transmission for stopping rotation of the engine includes activating an electric pump of the transmission. The method further comprises predicting a transmission output shaft speed at which the torque converter clutch will be commanded to unlock after a time duration, where the time duration is a predicted future time from or beginning when a torque converter clutch is predicted to open or unlock to an actual unlock command of the torque converter clutch. The method includes where the predicted transmission output shaft speed is based on a predicted amount of time in the future from torque converter clutch predicted opening to an actual torque converter clutch unlock command.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle driveline, comprising:
   unlocking a torque converter clutch in response to a first unlock schedule during a first condition, where the first condition includes a propulsion pedal being applied; and
   unlocking the torque converter clutch in response to a second unlock schedule during a second condition, the second condition including a brake being applied, an integrated starter/generator having torque capacity to start an engine, and a battery having a capacity to start the engine.

2. The method of claim 1, where the first unlock schedule unlocks the torque converter clutch at a higher vehicle speed than the second unlock schedule unlocks the torque converter clutch.

3. The method of claim 1, where the capacity includes a discharge capacity being greater than a threshold.

4. The method of claim 1, where the capacity includes a battery state of charge being greater than a threshold.

5. The method of claim 1, where the first condition includes the brake not being applied.

6. The method of claim 1, where the battery supplies power to an integrated starter generator.

7. A vehicle system, comprising:
   an internal combustion engine;
   an automatic transmission including a torque converter and a torque converter clutch; and
   a controller including executable instructions stored in non-transitory memory that cause the controller to predict a transmission output shaft speed at which the torque converter clutch will be commanded to unlock after a time duration, and additional instructions to activate an electric pump of the automatic transmission in response to preparing for stopping of the internal combustion engine.

8. The vehicle system of claim 7, where the time duration is a predicted future time from when a torque converter clutch is predicted to open or unlock to an actual unlock command of the torque converter clutch, and where the transmission output shaft speed is predicted based on a time to prepare vehicle subsystems for stopping of the internal combustion engine.

9. The vehicle system of claim 8, where the time to prepare the vehicle subsystems for stopping the internal combustion engine is based on vehicle subsystem components, and where the transmission output shaft speed is also predicted based on a rate of change of speed of a transmission output shaft.

10. The vehicle system of claim 8, where a preparation for internal combustion engine shut down begins when a predicted torque converter unlocking event is true, and where the predicted torque converter unlocking event is true based on a predicted output shaft speed.

11. The vehicle system of claim 7, further comprising additional instructions to request stopping of rotation of the internal combustion engine.

12. The vehicle system of claim 7, further comprising additional instructions to extend locking of the torque converter clutch responsive to vehicle speed.

13. The vehicle system of claim 7, further comprising additional instructions to activate an electric pump of the automatic transmission in response to preparing for stopping of the internal combustion engine.

14. A method for operating a vehicle driveline, comprising:
while a propulsion pedal is fully released, unlocking a torque converter clutch in response to a second unlock schedule, the unlocking performed in response to a brake being applied, an integrated starter/generator having torque capacity to start an engine, and a battery having capacity to start the engine.

15. The method of claim 14, further comprising entering an engine into a fuel cut-off mode.

16. The method of claim 14, further comprising preparing a transmission for stopping rotation of the engine.

17. The method of claim 16, where preparing the transmission for stopping rotation of the engine includes activating an electric pump of the transmission.

18. The method of claim 14, further comprising predicting a transmission output shaft speed at which the torque converter clutch will be commanded to unlock after a time duration, where the time duration is a predicted future time from when a torque converter clutch is predicted to open or unlock to an actual unlock command of the torque converter clutch.

19. The method of claim 18, where the transmission output shaft speed is predicted based on an amount of time in beginning from when the torque converter clutch is predicted to open to an actual torque converter clutch unlock command.

* * * * *